(12) United States Patent
Paige

(10) Patent No.: US 6,327,806 B1
(45) Date of Patent: Dec. 11, 2001

(54) OPTICAL SIGHTING DEVICES

(75) Inventor: Clive Rawlinson Paige, Water Oakley (GB)

(73) Assignee: Firearms Research Limited, Berkshire (GB)

( * ) Notice: Subject to any disclaimer, the term of this patent is extended or adjusted under 35 U.S.C. 154(b) by 0 days.

(21) Appl. No.: 09/269,346

(22) PCT Filed: Sep. 24, 1997

(86) PCT No.: PCT/GB97/02601

§ 371 Date: Mar. 25, 1999

§ 102(e) Date: Mar. 25, 1999

(87) PCT Pub. No.: WO98/13717

PCT Pub. Date: Apr. 2, 1998

(30) Foreign Application Priority Data

Sep. 25, 1996 (GB) .................................... 9620001

(51) Int. Cl.$^7$ .................................. F41G 1/04; F41G 1/30
(52) U.S. Cl. ................................ 42/113; 42/130; 42/131; 42/137; 42/143
(58) Field of Search ............................. 42/100, 101, 103, 42/113, 130, 131, 137, 143; 33/241, 246, 248

(56) References Cited

U.S. PATENT DOCUMENTS

| 2,633,051 | * | 3/1953 | Davis .................................... 350/442 |
| 3,942,901 | * | 3/1976 | Ekstrand .............................. 356/251 |
| 3,963,356 | * | 6/1976 | Wiklund ................................. 33/241 |
| 4,677,782 | | 7/1987 | Kaye ...................................... 42/100 |
| 5,189,555 | | 2/1993 | Jorlov ................................... 359/618 |
| 5,369,888 | * | 12/1994 | Kay et al. ............................. 33/241 |
| 5,440,387 | * | 8/1995 | Montelin et al. ...................... 33/241 |
| 5,508,843 | * | 4/1996 | Tomita ................................... 33/241 |

FOREIGN PATENT DOCUMENTS

| 0069575 | 1/1983 | (EP) . |
| 9507444 | 3/1995 | (EP) . |
| 2481435 | 10/1981 | (FR) . |
| 2277606 | 11/1994 | (GB) . |
| 2292465 | 2/1996 | (GB) . |

* cited by examiner

*Primary Examiner*—Stephen M. Johnson
(74) *Attorney, Agent, or Firm*—Thomas M. Freiburger

(57) ABSTRACT

An optical device for aiming at a target wherein an optical element of the optical device has a surface that reflects a source of light to create a sighting image for alignment with the target. The optical element has aspherical surface to minimize aberrations of the target.

36 Claims, 9 Drawing Sheets

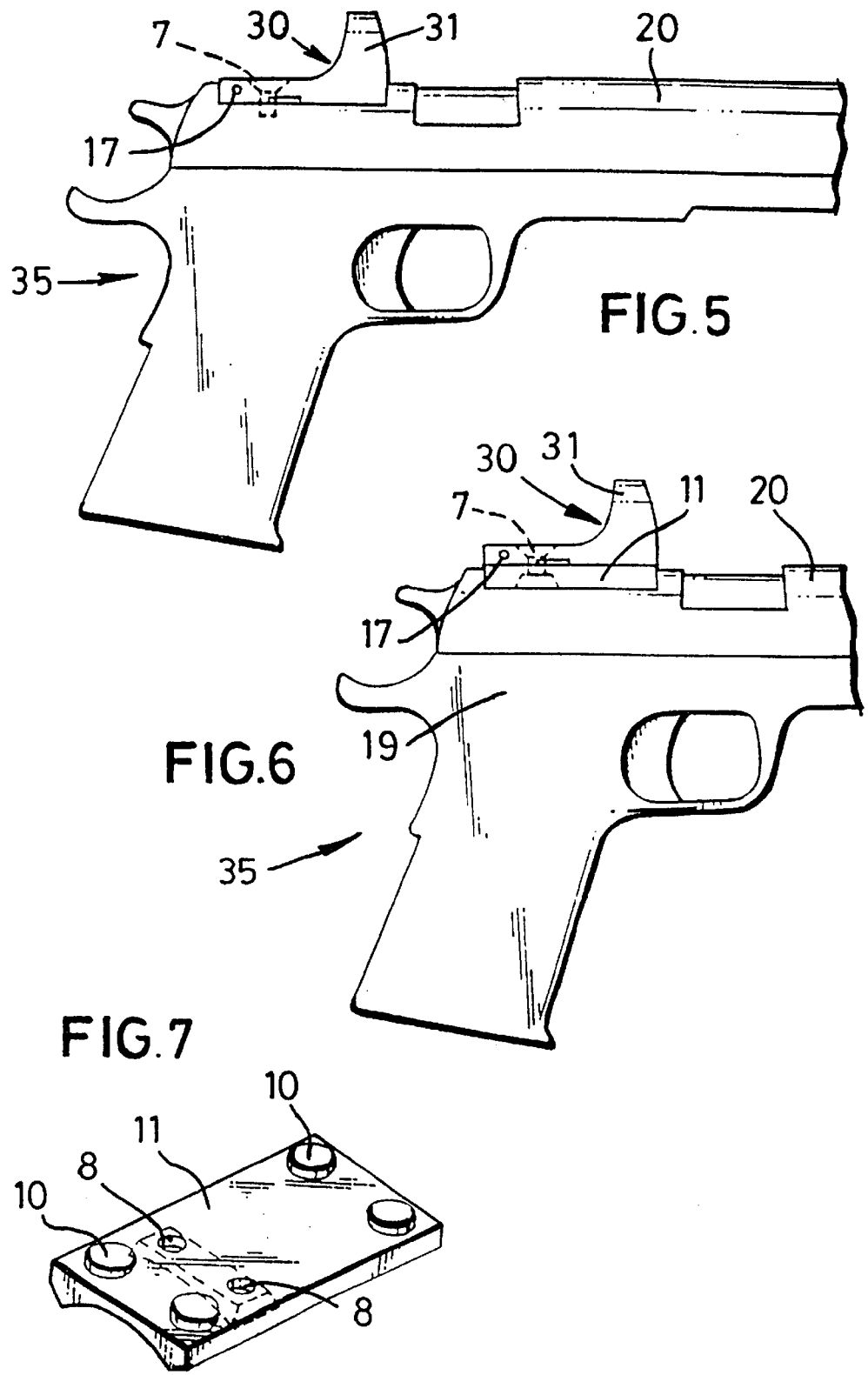

OPTICAL SIGHTING DEVICES

DESCRIPTION

1. Technical Field

This invention relates to optical devices for sighting at a target to be aimed at, and more particularly, but not exclusively, to an electro-optical sighting device for a hand gun.

2. Background Art

Optical sights can be mounted on a hand gun, rifle, shotgun or other small arm which includes bow, cross bows, paint guns and air guns. In sights of this type, a graticule is illuminated using incident light either from the target area, from the sky above, or from an adjacent artificial light source such as a Tritium Phosphor, or a light emitting diode (LED). The graticule may either reflect the incident light or transmit the incident light to form a sighting image.

The target is viewed through the sight usually by means of a planar doublet reflector, or a similar combination of spherical lenses, or a thin meniscus lens, which forms a sighting image of the graticule superimposed on an image of the target. With a spherical lens set, it is necessary to ensure that the angle formed between the light rays from the graticule which are reflected from a surface within the spherical lens set, and the optical axis of the lens set, is relatively small. This gives rise to relatively long focal lengths or small viewing apertures, otherwise spherical aberration will occur causing the graticule image to become blurred and parallax errors to become large.

Typically focal length to aperture ratios of up to 4:1 or more, are used. This requirement causes the optical arrangement to become long compared to its aperture, and it is difficult to make compact designs. It is possible to avoid the problem of spherical aberration by using aspherical lens sets, but these have been difficult and expensive to produce.

Battery life is a fundamental problem when these systems are considered for use in arduous conditions such as military or law enforcement applications. Even high performance types of LED have high current consumptions when maximum brightness is required in bright sunlit conditions. Reducing the brightness of the LED would enhance the battery life but to the detriment of useability. Alternatively, larger batteries add to the bulk of the system.

Mounting optical sights, which have circular optical apertures principally derived from rifle telescopic sights where this is suitable, low on to the top of a hand gun, means that the optical area immediately above the gun is at its narrowest, i.e. at the edge of the optic. The area on either side of this is usually taken up by the optical housing and mount system. In effect the conventional shape is entirely wrong for mounting onto a hand gun, where a wide aperture is desirable close to the top of the gun.

Moreover, known optical systems used particularly in competition shooting, have the system mounted onto the frame of the hand gun using an additional bracket or an integral bracket arrangement which causes the sight to be mounted above the gun in such a manner that the profile of the gun is greatly increased. Any increase in profile causes the gun to become more cumbersome, especially if the sight weights several once, (1 oz.≈28 gm). It also has the disadvantage that the top of the gun, which can be used by the eye to quickly align the gun with the target, can no longer be seen by the shooter.

A further disadvantage of such a system is that the gun has to be specifically modified to accept the mounting bracket. This means that retro-fitting to a standard gun is expensive, and the gun is permanently marred if the sight is subsequently removed. Furthermore, most integral mount systems are specific to one type of hand gun and cannot be fitted to rifles and/or revolvers and/or semi-auto pistols without further specialised brackets.

Most electro-optical sights suffer from the violent vibration and shock that is produced by hand guns when they are fired. This is most noticeable in some types of competition shooting where large numbers of relatively high power cartridges are fired. The mount system is often designed to try to isolate this vibration from the sight. These mount systems are usually fastened to the frame of the hand gun since, when the gun is fired, the frame is subject to a much smaller movement and lower vibration than, for example, the slide of the gun. Thus, for ideal sighting purposes, the sight should be mounted in a position directly onto or set into the rear part of the slide of a semi-automatic hand gun. However, the vibration and high acceleration would then be passed directly to the sight. Known sights are not constructed in a manner which could be suitably adapted to this type of mounting on the gun's slide or could withstand the forces imposed on it.

When an electronic failure occurs it is seldom likely to be the electronic components themselves but their mechanical/electrical connection to other components, such as switches, battery connections, circuit board contacts, solder contacts, etc. Usually, in known sight designs, some or all of these components are mounted permanently within the sight, which means that the sight has to be replaced or repaired by the manufacturer, should failure occur.

Known electro-optical sights, which employ an LED, use an electro-mechanical system to switch the LED on and control its intensity. Using a switch system has several disadvantages; primarily the user may neglect or not have time to actuate the switch and adjust, e.g. for light intensity, the device when required, or may neglect to switch the system off. If left switched on, on full brightness, the battery will be exhausted in a few hours and the system becomes useless. Switches also are prone to failure due to vibration, shock and physical damage.

These systems would have to be especially rugged to survive day-to-day service life in a military environment and be able to withstand severe impact and drop tests. Known systems cannot fulfil this criteria of compactness and ruggedness.

Another problem with electro-optical sights is the spherical aberration of the optical element. An attempt to address this problem is made in U.S. Pat. No. 5,189,555 where the element, which has a long focal length (apparently of the order of 9 cm), has its surface facing away from the LED of an indeterminate shape and its surface towards the LED parabolically shaped—as is well known for avoidance of parallax and spherical aberration problems. However, the long focal length makes the overall length of the sight too long for weapons requiring a short length for the sight, and also seems likely to produce an aperture ratio no better than about f.3 or f.4. If the focal length of the lens of U.S. Pat. No. 5,189,555 were to be reduced and, to reduce costs, the lens were to be molded of plastics material, then to ensure molding accuracy it would of necessity result in a thin lens. However, due to its thinness, such a thin lens would be liable to relaxation and/or movement in use and provide for inaccurate focussing and/or imaging aberrations of the electro-optical sight incorporating such a lens.

The present invention aims to overcome one or more of the above-mentioned and/or other disadvantages of the prior art.

According to one aspect of the invention there is provided an optical device for sighting a target to be aimed at in the line of sight of a user, comprising an optical element of transparent material having a front surface for facing the target and a back surface in which the the user views an image of the target, and a source of light directed at and reflected back from the back surface to create a sighting image for the user to align with the image of the target as viewed in the optical element, characterized in that the optical element is a thick meniscus optical element as hereinbelow defined and is composed of a base element which (a) is provided on one face thereof with a mold-replicated parabolic aspherical surface that constitutes said back surface and defines it as one of short focal length, namely less than 5 cm (2 inches), and which (b) is provided on the other face thereof with an aspherical correcting surface that constitutes said front surface and is to minimise aberrations in the image of the target as viewed by the user.

The term "thick" meniscus optical element refers to one which has a thickness at least approximately 25% (preferably at least ⅓) of the effective diameter of the optical element.

It is also preferred that the front correcting surface provides zero power.

Preferably the focal length is; of the order of 2.5 cm (1 inch) This allows for the provision of an aperture ratio less than approximately 1.2 (and preferably approximately f.1). In this regard it will be appreciated that the "f" number of an optical element is equal to its focal length divided by its aperture. In one preferred embodiment of this invention, the optical element has a focal length of 2.5 cm and an "f" number of 0.75.

Preferably the sighting image is focused at or near infinity and the optical axis of both aspherical surfaces is parallel with the intended line of sight.

Advantageously the center of the optical axis of both aspherical surfaces is below or coincident with the bottom edge of the optical element. A pair of optical elements may be formed from one originating element of transparent material by dividing (e.g. cutting) the originating element in two parts, the dividing edge of each part providing the said bottom edge of that optical element.

Before or after division (e.g. by cutting), the originating element or each optical element, may be shaped on one or more (other) edges, e.g. to form a substantially D-shaped optical element.

Preferably the optical element is formed of transparent plastics material.

Optionally the back reflecting surface of the optical element has a Dichroic coating whereby it reflects selectively a narrow band width of light from the light source. The coating may be omitted or coated to a lesser extent on at least a central part of the optical element bordering the base edge of the optical element.

According to a second aspect of the invention, there is provided an optical sighting device for a hand gun, the sighting device being adapted to be mounted in place of the conventional rear sight, the device, either itself, or via an adaptor, registering with an existing feature on the gun whereby original alignment can be maintained if the device is removed and replaced.

Preferably the sighting device may be mounted on the gun via an adaptor, and locating means are provided for registering the alignment of the device relative to the adaptor.

Alternatively, the sighting device may be adapted to be mounted on the slide of a hand gun having a rear sight dovetail feature on its upper side, the device being fittingly secured to the existing dovetail feature or a replacement dovetail feature e.g. being secured thereon by screws or studs. Preferably the device is mounted to fit flush with the slide to achieve optimum compactness and low profile e.g. (if necessary) by appropriate machining of the slide.

The light source is preferably an LED aligned with the center of the optical axis of the optical element and has a shaped emitting area, for example, a spot or a cross of small (minimum) area. This permits reduction of the power requirement to a minimum. Advantageously, the LED is a quaternary, fine geometry LED, e.g. of indium, gallium, aluminium and phosphide (IN—GA—AL—P). This permits of a highly concentrated emitted beam having a low battery power requirement.

Optionally, the LED and its associated electronic components may be encapsulated and, together with the battery contacts, provide a single unit. This allows for complete and easy replacement. Preferably the encapsulated electronic unit is isolated from the remainder of the device by a resilient layer, e.g. an elastomeric layer of silicone rubber or similar material.

According to a third aspect of the invention there is provided an optical device for sighting a target to be aimed at in the line of sight of a user, comprising a thick meniscus optical element of transparent material having a front surface for facing the target and a back surface in which the user views an image of the target, and a source of light directed at and reflected back from the back surface to create a sighting image for the user to align with the image of the target as viewed in the optical element, the device including a cover movable from a covering condition—in which it reduces the power consumption of the light source towards zero and thus acts in substantial equivalence to a switch effectively switching the light source off—and a covering condition in which it permits the sighting device to be used.

In the case of the device being intended for use on a hand gun to be retained in a holster when not being used, the cover may have means, for example, a lanyard for attachment to the holster, whereby removal of the gun from its holster by the user removes the cover from the sighting device.

According to a fourth aspect of the invention there is provided a hand gun or other small arm having mounted thereon a sighting device according to any one or more of the above-mentioned aspects.

BRIEF DESCRIPTION OF THE DRAWINGS

By way of example, a specific embodiment in accordance with the invention will now be described with reference to the accompanying diagrammatic drawings in which:

FIG. 5 shows the sighting device of FIG. 1 mounted on a hand gun;

FIG. 6 shows an alternative arrangement in which the sighting device is mounted on a hand gun having a rear sight dovetail feature and an adaptor plate locating the sighting device relative to the slide of the hand gull;

FIG. 7 is a perspective view of the adaptor plate of FIG. 6 showing the registration pins;

DETAILED DESCRIPTION OF EXAMPLES(S) OF THE INVENTION

The illustrated example concerns an electro-optical sighting device intended for mounting on a hand gun but which is also suitable for mounting on other small arms such as rifles, shot guns and, if desired, bows, cross-bows, paint guns and air guns where the user requires to aim at a target in the light of sight.

Figure 1:
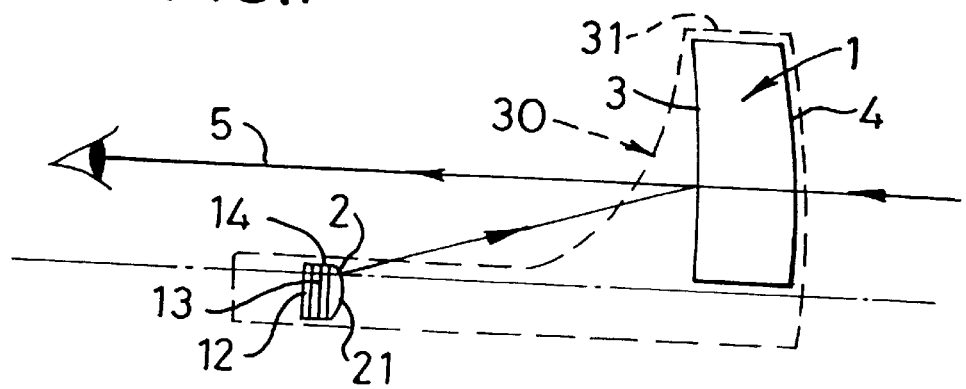
FIG. 1 is a side view of an electro-optical sighting device including an optical element.

Referring to the drawings, there is shown in FIG. 1 an optical sighting device comprising a thick meniscus optical element 1 having a front surface 4 for facing the target and a back surface 3 in which the user views an image of the target. The optical element 1 is mounted in a generally upright position at the leading end of housing. In this embodiment, the housing is formed of plastics material by injection molding and comprises a base portion and at its leading end an upstanding enclosure 31 for the optical element 1. During assembly, the optical element 1 is fitted into the enclosure 31 by inserting the element 1 into a locating groove extending around the inner wall of the enclosure. The optical element 1 is thereby located in its intended orientation within the enclosure and held therein by a molded plug 32 (FIG. 11) snap-fitting into the base of the housing from below and forming the bottom wall of the enclosure. In this embodiment, the optical element is also secured within the enclosure 31 by adhesive round its edges. Both surfaces 3,4 are aspherical surfaces and are described in detail below.

Mounted in the base of the housing adjacent the end remote from the optical element 1, is a light source directed at and reflected back from the back surface 3 to create a sighting image for the user to align with the image of the target as viewed in the optical element 1. The light source which, in this embodiment, is a light emitting diode (LED) 2 is aligned with the center of the optical axis of the aspherical surfaces 3,4 but lies below the line of sight 5. The optical axis is also parallel to the line of sight. Thus the LED provides an illuminated sighting image which can be viewed together with an undisturbed image of the target. This avoids the need to angle the optical axis relative to the line of sight to avoid the light source and housing entering and masking the viewed area and resulting in a disturbed image of the target.

The reflecting surface 3 provides a sighting image, focused at or near infinity, to be aligned with the image of the target. Advantageously there is provided a system in which a dot, a cross, or the like, remains parallel to the gun and can be used either in the middle or extreme edges of the optical element 1. This provides a sight which is easy to use as the user's eye can be at any distance behind the optical element and both eyes can be kept open, greatly increasing the target scene awareness and improving hit probability.

By using a relatively thin walled enclosure 31 around the optical element 1, the visible area of the housing will appear small to the user and out of focus when the target area is being viewed. This provides the advantage of a seemingly uninterrupted viewing area.

The reflecting surface 3 in this embodiment, also has a short focal length (i.e. less than 5 cm), e.g. of the order of approximately 25 mm, to provide an aperture ratio less than 1.2 (preferably less than f.1), and selectively reflects light in a predetermined narrow band width encompassing the wavelength(s) of light emitted by the LED. For this reason, as well as to minimise power consumption, it is therefore advantageous to use an LED specifically designed so that the light emitting area is no bigger than that required, and there is no central anode bond wire to interfere with the sighting image transmitted to the user. The quaternary LED of IN—GA—AL—P used in this embodiment for the LED 2 has a structure which allows a specific shape of light emitting area to be defined, e.g. a spot or a cross, without impediment by the anode contact or bond wire. This is in contrast to the conventional LED's which have an emitting area with a gold bond connection in the center and, to produce the spot or cross, have to include a correspondingly shaped aperture in a mask that is placed over the emitting area to produce a sighting image of the right size without viewing the gold wire going to the center of the emitting area. The quaternary LED 2 of this embodiment has no mask and thus avoids wasting energy in producing illumination which is then masked.

In this embodiment, a small illuminated area of the quaternary LED 2, less than $100\mu$ (preferably in the range $25\mu$ to $50\mu$, i.e. about $\frac{1}{50}$th that of a standard LED having an illuminated area of about 0.2 mm diameter, is used. This, coupled with the high efficiency of the LED, allows current consumption to be substantially reduced by at least an order of magnitude compared to known systems. This allows the opto-electronic unit to be powered by its own internal battery for extended periods without substantially affecting the size or weight of the unit. The small diameter of the light emitting area, in this embodiment, is made possible by the short focal length of the aspheric reflecting surface 3. Typically, a focal length to aperture ratio of better than 1:1.3 (preferably approaching 1:1) is used.

Figure 15:
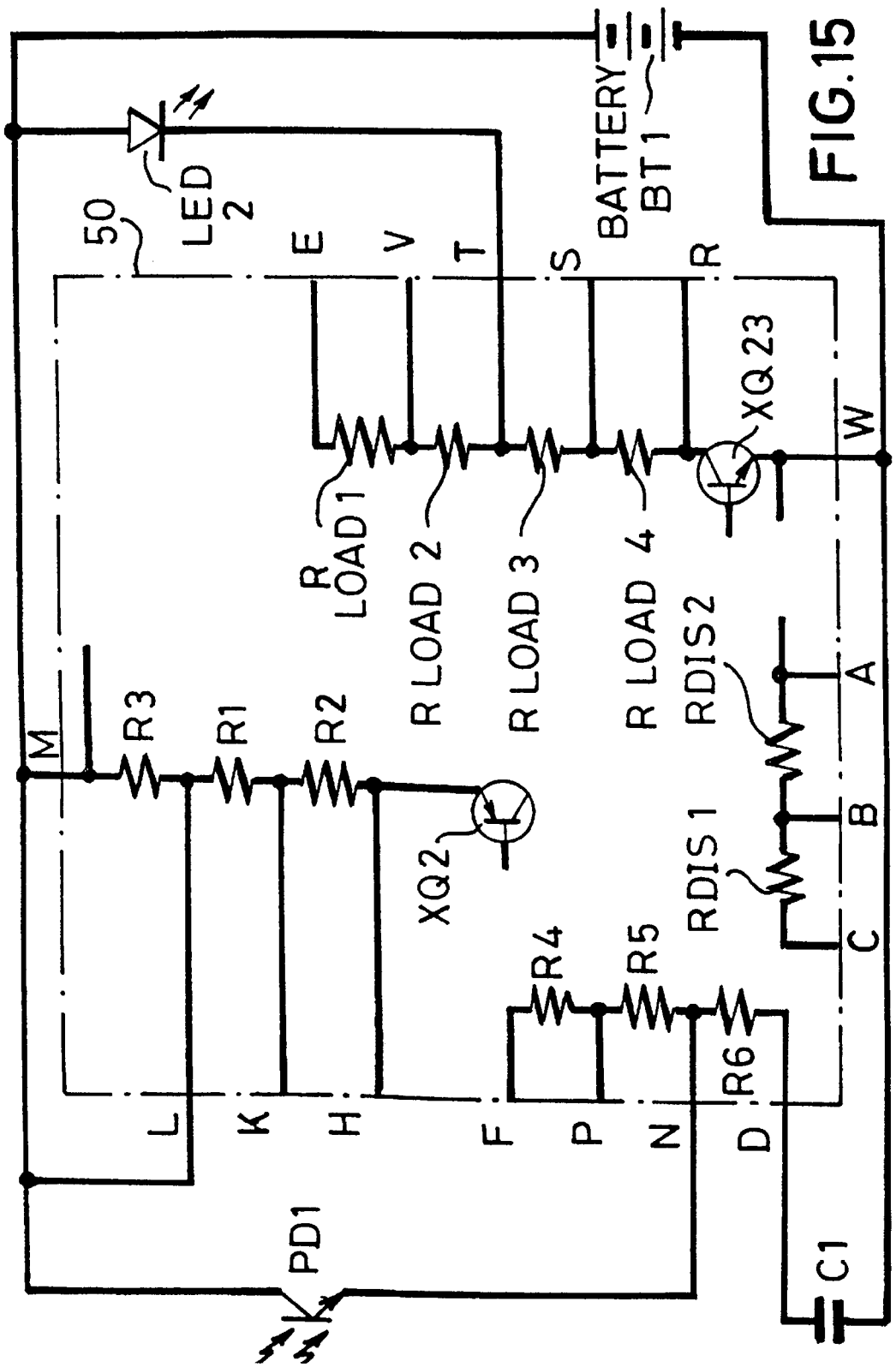
FIG. 15 is a schematic block circuit diagram of the electronic components of the sighting device incorporating an ASIC (application specific integrated circuit)
Figure 16:
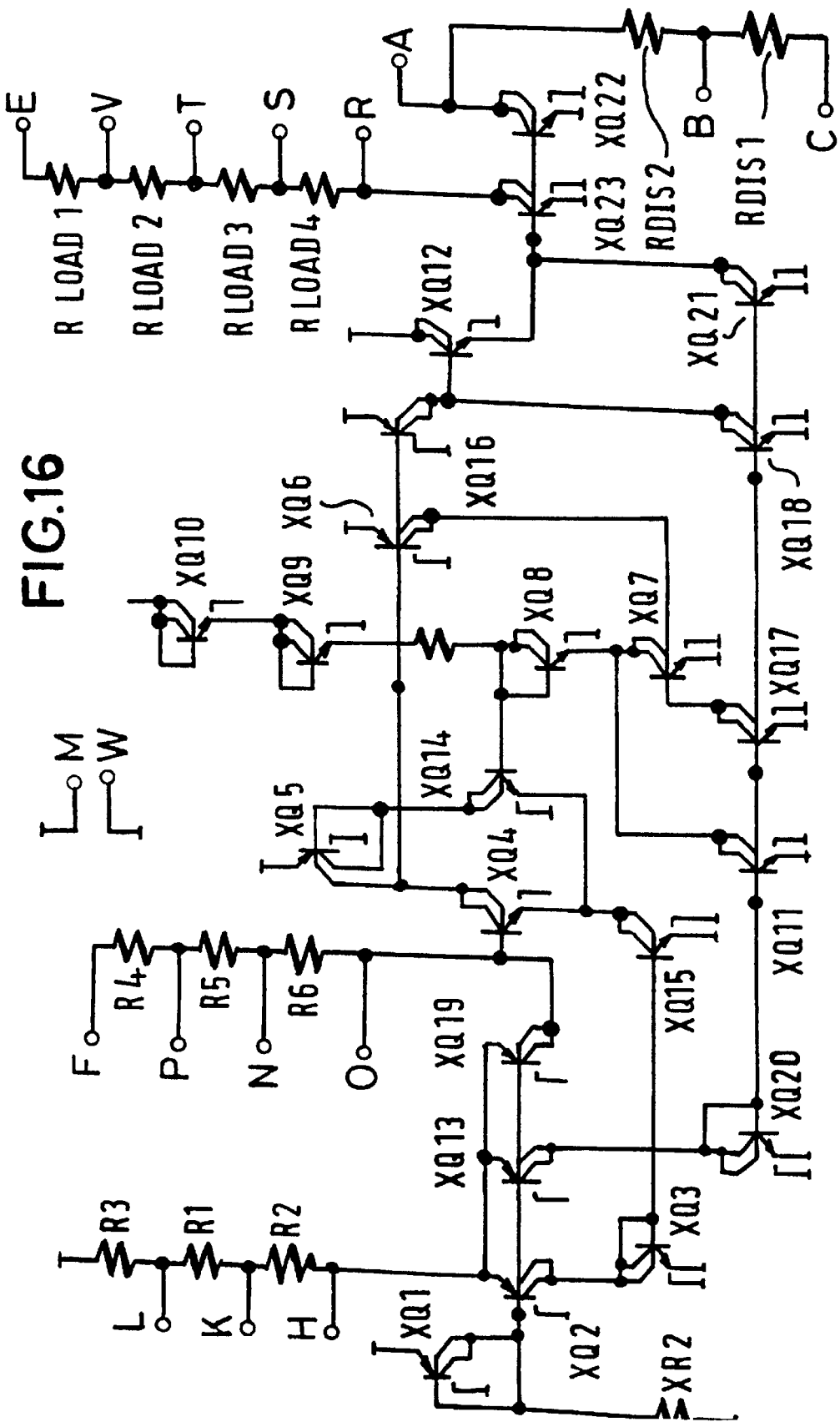
FIG. 16 is a detailed schematic circuit diagram showing 35 components of the ASIC.

To further minimise power consumption, and as shown FIGS. 15 and 16, the LED 2 is coupled with a battery BT1 and a photo-detector PD1 to an ASIC (application specific integrated circuit) 50 having PAD terminals A–F, H, K–N, P, R–T, V, W. The circuit functions to provide pulse width modulation of the signal to the LED in response to the signal strength obtained from the 'photo-detector PD1. The operation is such that, in low light conditions, the signal from the photo-detector PD1 promotes a pulse signal to the LED that has short duration and wide gaps—i.e. utilises minimal battery power and prolongs battery life—whereas in high light condition (such as bright sunlight) the pulse width is longer and the gaps smaller. For example, the current consumption for the ASIC 50 may be as low as $3\,\mu A$ and the RMS current consumption for the LED in the dark may be a similar low value, whereby an exceptionally long battery life (perhaps 3 or 4 years) can be achieved when the sight is little used.

Essentially, the illustrated circuit functions as an astable multi-vibrator with the mark-space ratio controlled by the phototransistor PD2. This alters the brightness of the LED 2 depending on the amount of ambient light falling on the phototransistor. The amount of time the LED is 'on' is nominally constant, with the 'off' time controlled by the phototransistor.

XQ1, XQ2, XR2 and R1, R2, R3 generate an overall bias for the circuit. Pads L, K, and H allow for adjustment of the bias current to cater for the wide manufacturing tolerances of the resistor XR2.

An external capacitor C1 is connected to pad D. The phototransistor can be connected to pads F, P or N. With no light on the phototransistor PD1, XQ19 provides a small charge current for the capacitor C1. With light on the phototransistor PD1, more charging current is supplied to capacitor C1 causing to charge up faster. R4, R5 and R6—via pads F, P, N and D—allow some adjustment of the effect of the phototransistor. XQ4 and XQ14 form a voltage comparator with XQ5 as the load and XQ15 providing the bias current via XQ3. Components XQ10, XQ9, XR1, XQ8 and XQ11 provide the input to one side of the voltage comparator, with the capacitor voltage being input to the other side. When the capacitor voltage is high enough, the comparator switches, with XQG turning 'on'. This in turn switches 'on' XQ7 which switches the level of the voltage into the comparator to provide some hysteresis. XQ17 ensures that XQ7 is normally 'off' until XQG turns 'on' When XQG is 'on', XQ1G is also turned 'on'. This in turn switches 'on' XQ12 and XQ23 which turns 'on' the LED. The LED current is limited by the selection of resistors RLOAD1, RLOAD2, RLOAD3 and RLOAD4 which, by selecting or connecting in parallel using the pads E, V, T, S and/or R, can be used to select a range of peak currents for the LED.

Components XQ18 and XQ21 ensure that XQ12, XQ23 and XQ22 are turned 'off' when not require~to be turned 'on'. XQ22, /which is turned 'on'. When LED 2 is turned 'on', provides a discharge current for the capacitor C1 via RDIS2 and/or RDIS1 using pads A, B and/or C. Again, a parallel—combination can be used. The time taken for the capacitor to discharge below the new comparator threshold determines the LED 'on' time. When the threshold is reached, the discharge is stopped, the LED is turned 'off', the comparator threshold returns to normal, and the whole cycle repats—allowing the phototransistor PD1 to charge the capacitor again.

It will thus be apparent that more light will increase the rate of charging, making the 'off' time shorter and the LED brighter, although the 'on' time will remain approximately constant. In practice, the circuit is arranged to provide for the LED 2 to be normally 'on' for a few microseconds, with the 'off' time varying from say 20 ms to a few microseconds depending on the ambient light intensity and the values of the external components and the battery voltage. This variation can give a brightness control range of several thousand to one.

Selective reflection of the narrow band width of light which is emitted from the LED 2, rather than the general broad band width of visible light that makes up the viewed target area, is achieved by applying a Dichroic coating 33 (FIG. 4) on the reflecting surface 3. The coating comprises several (e.g. eight) layers of vapour deposition materials such as magnesium fluoride and titanium dioxide applied in a high vacuum. This is selectively used to reflect light in a predetermined bandwidth encompassing wavelengths of light—typically of the order of 620 nm—emitted by the quaternary LED (as compared with about 650 nm for conventional LED's) whilst allowing transmission of other wavelengths. This permits high transmission of light from the target area to the operator through the optical system, and high efficiency of reflection of the light from the LED 2.

The Dichroic coating 33 can be selectively masked from coating the entire area of the optical element. An area, which is free from this coating or which has a lower efficiency coating, will have a lower LED reflecting performance. This will result in the sighting image changing its intensity as it traverses from a coated area of the reflecting surface 3 to the masked area. In this embodiment, there is provided a semi-circular masked area 34 at the center of the bottom of the reflecting surface 3 (FIG. 4), whereby under bright sunlight, if the sighting image is too bright, for example, when shooting small targets at long distance, then the dot or the like can be traversed down and/or across into the lower uncoated area, or area of reduced coating, where the intensity is, say, halved, thus allowing precision shooting without external adjustment of the intensity of the light source. This area 34 also acts as an indicator of battery condition, since when the dot or other shape is not visible in the area 34, then the dot or other shape is not bright enough due to low battery, even though the dot or other shape is still visible and useable in the normally coated area. This indication of low battery condition is a beneficial feature, in practice, for the user.

If no dichroic coating is used at all then an anti-reflective coating can be added to a small central area of this reflecting surface to give a similar effect.

The sighting device of this embodiment is a compact unit with good transmission of light from the target whilst maintaining low power consumption. The back surface 3 of the thick meniscus lens 1 is a true or off-axis parabolic aspherical reflecting surface, and the front surface 4 is also aspherical and designed as an optical correcting surface to minimise aberrations, e.g. spherical aberrations and parallax errors. This correcting front surface 4, being at some distance from the thick meniscus lens's back reflecting surface 3, further minimises ghosting and in this embodiment provides zero power.

It is convenient to produce the optical element by replicating each of the aspherical surfaces 3,4 onto a base element having suitably pre-shaped surfaces using a mold with aspherical surfaces of the required configuration. Conveniently, such a replicating process involves forming, by means of a diamond-tool CNC machine, a metal master or mold to the precise optical characteristics required. A blank of acrylic plastics material is then rough cut on a CNC machine to approximately the desired spherical dimensions, and this blank is then lapped to provide a fine surface approximating still closer to the desired spherical dimensions. The lapped blank is then placed above a layer of UV-curing epoxy resin on top of the master located in a molding or casting tool, and then UV-curing is effected to bond the epoxy resin to the surface of the blank, the characteristics of the epoxy resin being selected to provide a refractive index the same as or close to that of the acrylic. The lens is removed from the mold with the lens now having a replicated surface applied to it conforming very accurately to that desired, i.e. conforming precisely to the desired curvature provided by the master. The same procedure is then repeated on the other side of the lens using another tool of the correct profile. After replicating both surfaces the lens, which is now a three-part construction or triplet lens, is cut diametrically in half to produce a pair of D-shaped lenses (for two sighting devices).

This replicating process has been found to be ideal for forming, at relatively low cost, a lens of the desired very short focal length. The parabolic form is thus necessarily 'steep' and has to be very accurate. Further optical accuracy has to be maintained despite vibrations in use and/or temperature variations, the lens has to be thick and hence the front surface has to be designed to match very carefully the rear surface. Desirably these are derived from a computer-generated profile that will provide no field disturbance due to angular aberrations, and will have a unit power magnification.

Quite remarkable accuracy was obtained in specific test examples of lenses produced by the above-described replicating process. Typically, these test examples had angular ray aberrations of less than ±0.2 minute (0.00006 milliradians). The significance of this value can be appreciated by recognising that the angular aberration limit that can be detected by the human eye is generally of the order of +/−1 minute +/−0.0003 milliradians). It will be appreciated that the thick meniscus, triplet lens of plastics material obtained by the above-described replicating process provides a tough, impact resistant, optical element. It will also be appreciated that the two replicated surfaces to each side of the lens can render the element resistant to scratches and to solvents.

It will be further appreciated that, instead of being formed of transparent acrylic, the lens may be formed of polycarbonate or some other suitable plastics material which combines rigidity and strength with light weight. Alternatively—and especially for use where temperature extremes are likely to be experienced—the inner core, i.e. the central part of the triplet lens, may be of glass with just the two outer surface parts of the triplet lens formed of plastics material by the replicating process described above.

Figure 2:
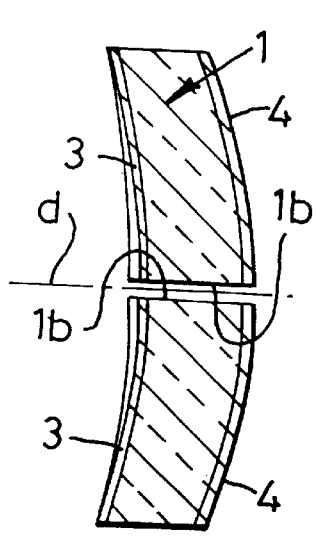
FIGS. 2 and 3 illustrate the production of two optical elements from one originating element.
Figure 3:
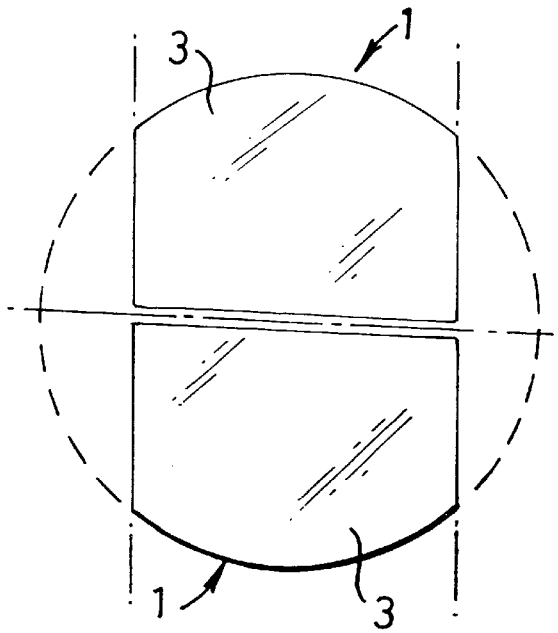
Figure 4:
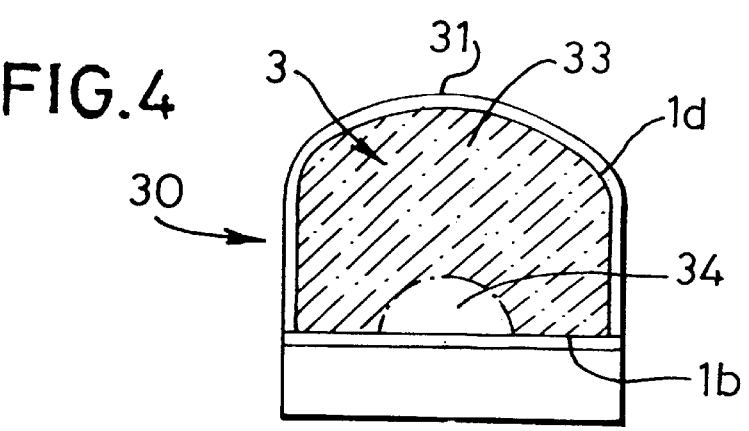
FIG. 4 shows the sighting device of FIG. 1 in the direction viewed by the user.

A further feature is that the meniscus lens 1 is only part of an originating element which is produced in full circular form as shown in FIGS. 2 and 3, and then cut in half along its diameter d. The cut edge of each half provides the base edge 1b of each meniscus, which is further reduced on at least its edges 1d to produce a D-shape (FIG. 4). Each half may also be reduced on its top edge to produce a square or rectangular meniscus. In each case two optical elements are produced from one originating element. This results in each meniscus providing a wide aperture directly above the gun, as well as being structurally sound and economical to produce.

The compact and lightweight optical layout allows the sight to be mounted securely on a hand gun using two screws 7 or studs passing through holes in the base of the housing 30. Instead of fixing the sight to the frame 19 of the gun, which would be usual, the sight is mounted on the slide 20 (FIGS. 5 and 6). In one embodiment (FIG. 6), the sight is retrofitted by removing the conventional rear sight dovetail or similar feature, and replacing it with an equivalent fitting modified for the mounting thereon of the electro-optical sight of this embodiment. This equivalent fitting, in this FIG. 6 embodiment, is a dovetail which has two threaded holes to accept the screws 7 passing through holes 8 in an adaptor plate 11 (FIG. 7) disposed between the sight and the slide 20 of the gun. In this embodiment, the adaptor plate 11 is molded or machined or otherwise shaped to fit the gun and has four pins 10 on its top side which register with respective circular recesses 23 in the underside of the base of the housing 30. The underside of the adaptor plate 11 is curved to correspond with the general curvature of the slide 20 of the gun. The pins 10 allow alignment to be maintained if the sight is removed and replaced.

Alternatively, as shown in FIG. 5, the slide 20 may be machined to allow the sight to fit flush within the slide to achieve optimum compactness and low profile. With this construction, the only part which the user in effect sees protruding above the slide is the D-shape of optical element 1—the base of the housing 30, which includes the battery and electronics, being confined within the original profile outline of the gun.

Figure 12:
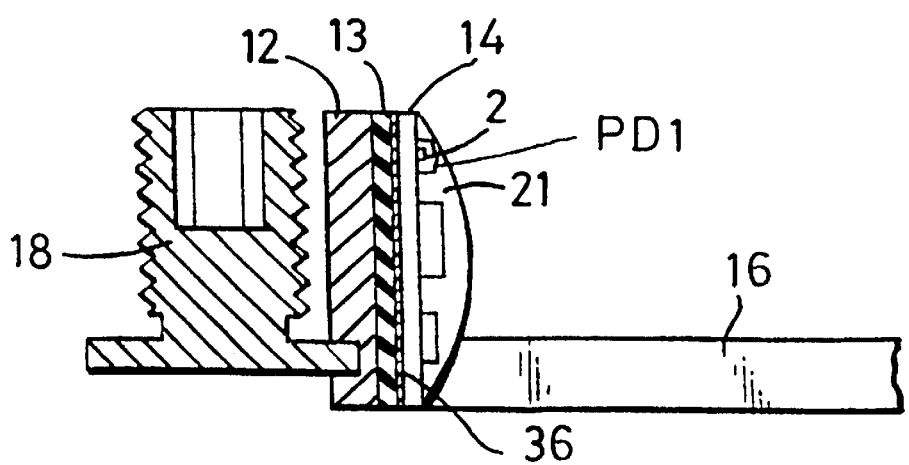
FIG. 12 is a side view of the encapsulated light source and associated electronic components.
Figure 9:
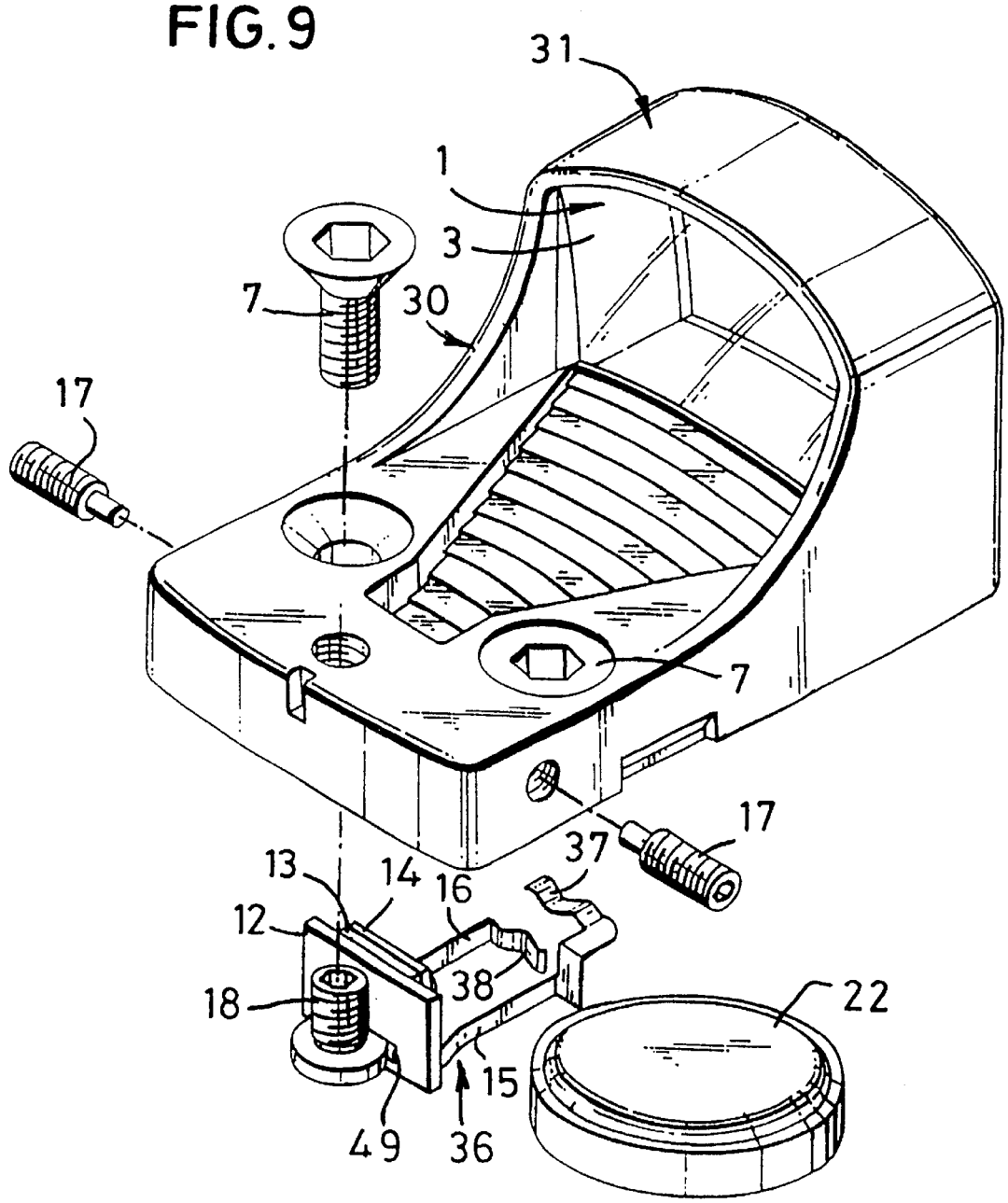
FIG. 9 is a perspective view of the sighting device of FIG. 1 partly in exploded form.
Figure 10:
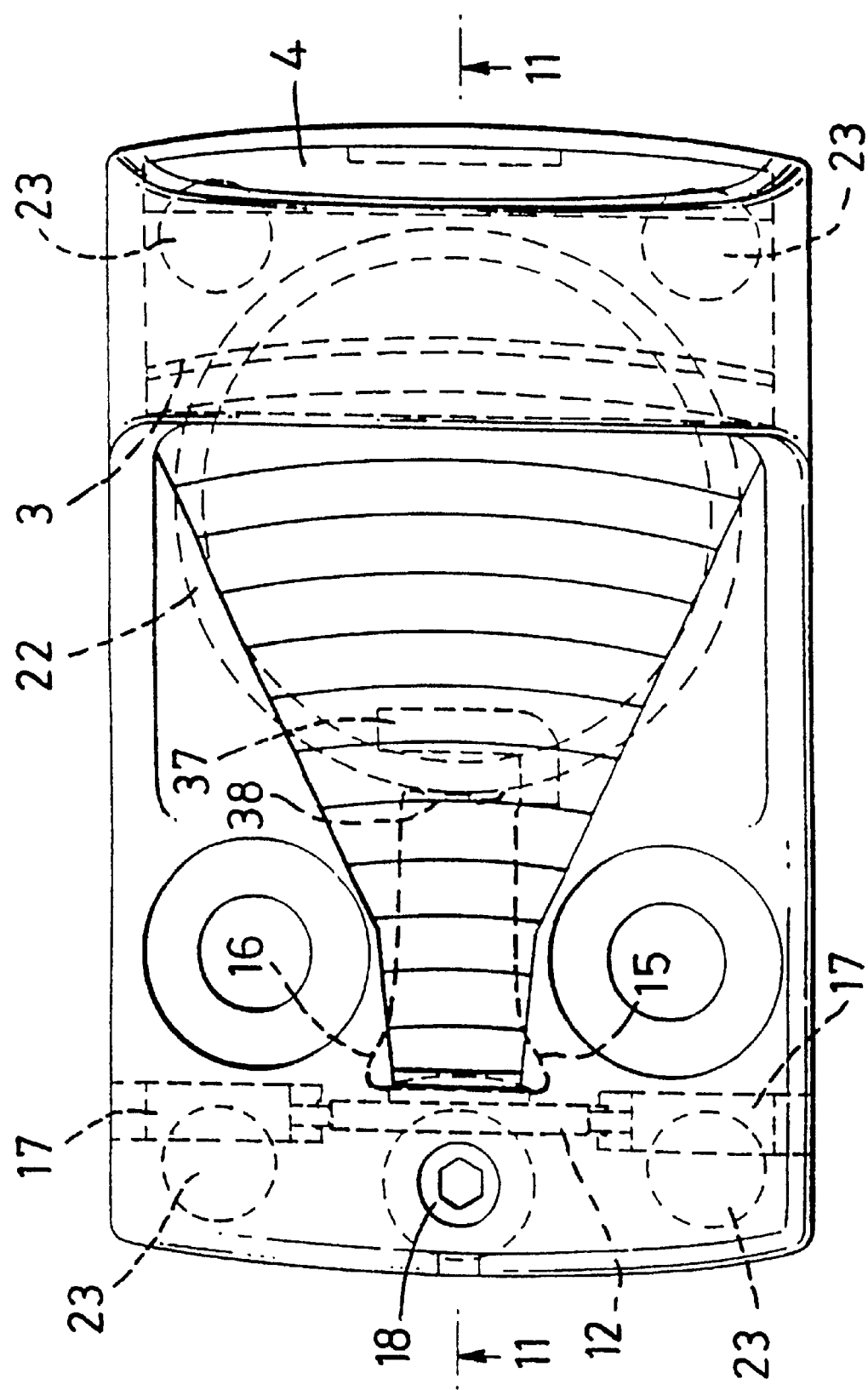
FIG. 10 is a plan view of the sighting device of FIG. 1.

As best seen from FIGS. 8–12, the electronics components including the LED 2 and the photodetector PD1, are mounted on a circuit board 14 which, in this embodiment, measures less than 5 mm square (see particularly FIG. 12). The components are encapsulated on the board 14 by a transparent epoxy or other scratch resistant coating 21. This coating secures the LED 2 and other components (and the aluminium or gold wire connections bonding them) as a unit against relative vibration. The coating 21 also allows the curved area in front of the LED 2 to be cleaned without damage to the underlying components and connections.

Figure 8:
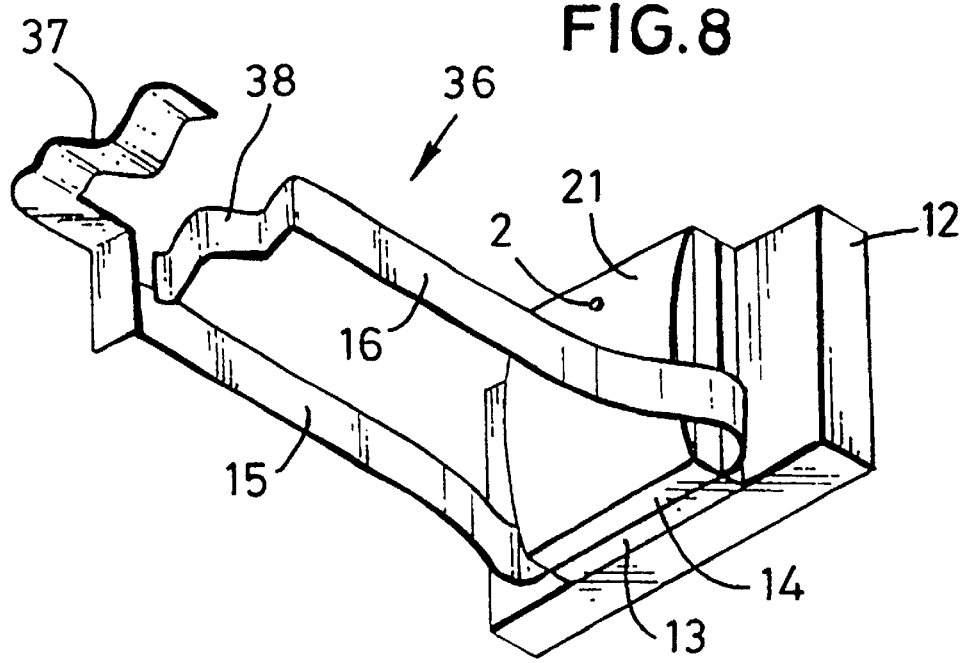
FIG. 8 shows a complete electrical assembly and light source for creating a light image in the optical element.
Figure 11:
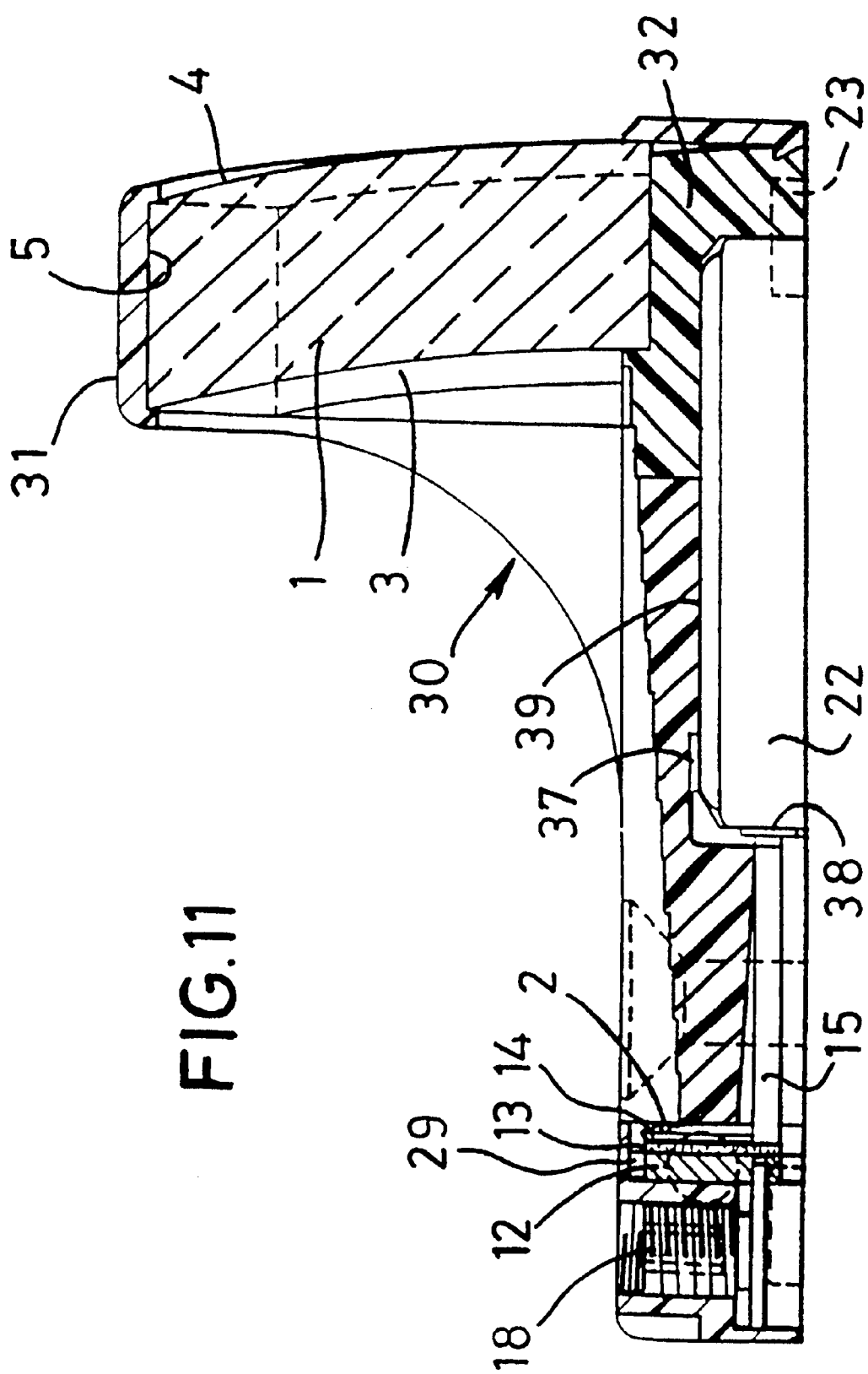
FIG. 11 is a section along line 11—11 in FIG. 10.

The electronic unit is connected to battery 22 by a stainless steel battery contact strip 36 having arms 15,16 leading to respective battery terminals 37,38 (FIG. 8). In this embodiment, the strip 36 is gold plated stainless steel and the terminals 37,38 are of wave formation which provides a spring contact between the respective terminal and the battery 22. The battery contact strip 36 (FIG. 8) is bent at right angles to the plane of the circuit board 14 to connect with the battery 22 which fits closely within a battery compartment 39 in the underside of the base of the housing 30 (FIG. 11). Alternatively, the compartment 39 may be configured to take two thinner batteries which gives a 6V power source instead of the single 3V battery source. This gives a brighter dot option.

The unit is mounted and firmly cemented on a stainless steel carrier plate 12 which is located at the desired distance from the optical element 1 within a slot 29 in the underside of the base of the housing 30 (FIG. 11) such that the circuit board and components face the reflecting surface 3 of the optical element 1. Alternatively the unit may be mounted on plate 12 via a layer of elastomeric or other resilient compound 13.

The rearward surface of carrier plate 12 is provided with a horizontal slot 49 (see FIG. 9) receiving the head of an azimuth adjustment screw 18. Adjustment of the position of the carrier plate 12 within the vertical slot 29 is achieved by azimuth adjustment screw 18 and by elevation adjustment screws 17, whereby the LED 2 may be moved relative to the optical element 1 to adjust for both azimuth and elevation. The adjustment screws 17 also act to lock the carrier plate 12, after adjustment has been completed.

The complete electrical assembly can be replaced by the user if desired.

Figure 13:
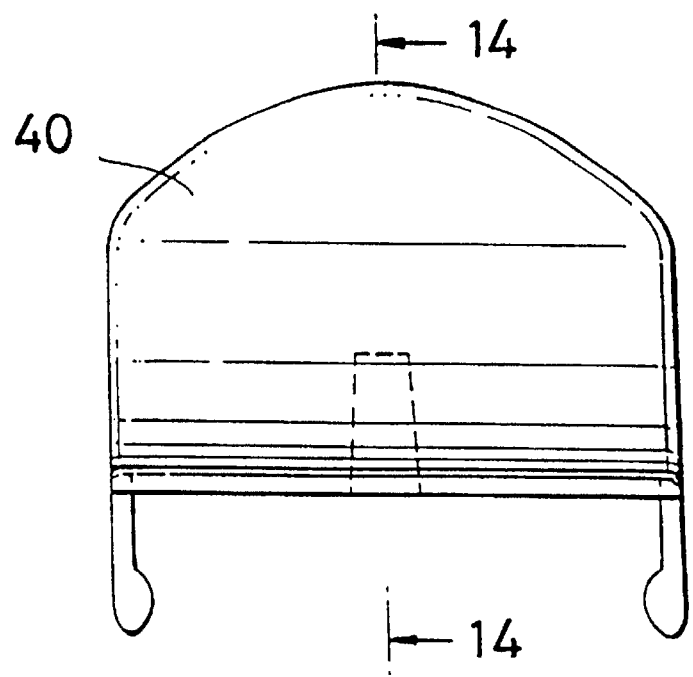
FIG. 13 shows a cover for the sighting device of FIG. 1.
Figure 14:
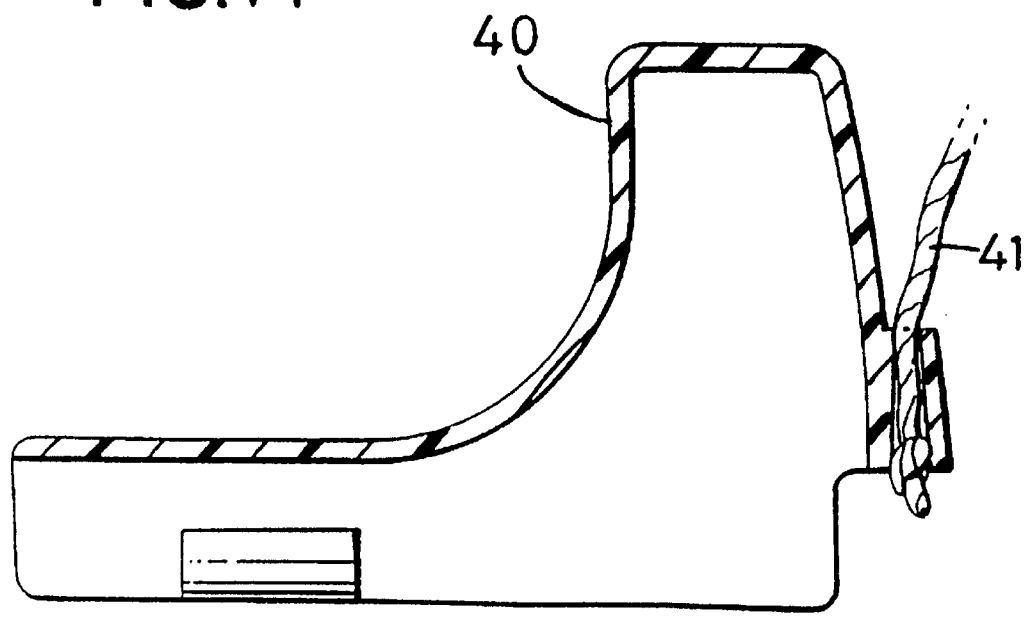
FIG. 14 is a section along line 14—14 in FIG. 13 showing a lanyard for attached of the cover to a holster for a hand gun on which the sighting device is to be mounted.

The photodetector PD1 forming part of the encapsulated unit adjusts the intensity of the LED 2 according to ambient light conditions above and ahead of the sight. When the sight is placed in darkness the intensity of the LED is still at a level such that it can be seen by the user, but at a sufficiently low level that the sight can remain switched on for a number of years. To provide this degree of darkness, an armour cover 40 (FIGS. 13 and 14) is provided which is snap-fitted over the sides of the housing 30 and shrouds the optical element 1 and the photodetector. This allows the sight to be carried in a holster (not shown) in daylight for a number of years without having to switch the system off. In effect, the cover acts as an on/off switch for the photodetector and the sight, whereby when the cover is in place, the system is effectively switched off, and when the cover is removed the system is effectively switched on (i.e. has a heightened illumination level) and the sight can then be used. Additionally, in this embodiment, the cover is attached to the holster by a lanyard 41 (FIG. 14) or other means in a manner whereby when the user removes the gun from the holster, the cover is pulled off and removed from the sight. The gun is thereby automatically and immediately made ready for aiming and firing.

One advantage of the cover 40 over a conventional on/off switch is that it is obvious that the cover has to be removed before the sight can be used (whether or not the optional lanyard 41 is provided). The cover also protects the optical element from damage when the gun is in service, and protects the optical element from dust, condensation and handling/finger prints. The lanyard 41 or other attachment means is particularly useful to allow single-handed operation for causing the cover to be pulled off as the gun is drawn from the holster. Furthermore, if the cover is not replaced, it is obvious that the sight is not effectively switched off. The cover 40 can also be removed single-handedly by pushing the cap up and off using the thumb whilst holding the gun. The action of the snap fitting causes the cover to spring off when pushed from below by the thumb.

Other modifications and embodiments of the invention, which will be readily apparent to those skilled in this art, are to be deemed within the ambit and scope of the invention, and the particular embodiment (s) hereinbefore described may be varied in construction and detail, e.g. interchanging (where appropriate or desired) different features of each, without departing from the scope of the patent monopoly hereby sought.

What is claimed is:

1. An optical device for sighting a target to be aimed at in the line of sight of a user, comprising:
    an optical element of transparent material having a first surface to be in use directed towards the target and a second surface in which the user views an image of the target, and
    a source of light directed at and reflected back from the second surface to create a sighting image for the user to align with the image of the target as viewed in the optical element,
    wherein the optical element is a thick meniscus optical element—namely one having a thickness at least approximately 25% of the effective diameter of the optical element—and is composed of a base element which
       (a) provides said second surface as a parabolic aspherical surface and defines it as one of short focal length, namely less than 5 cm (2 inches), and which
       (b) has an aspherical correcting surface that constitutes said first surface and is to minimize aberrations in the image of the target as viewed by the user.

2. An optical sighting device according to claim 1, wherein said second surface is a mold-replicated parabolic aspherical back surface of the base element.

3. An optical sighting device according to claim 1, wherein the first correcting surface provides zero power.

4. An optical sighting device according to claim 1 or claim 2, wherein the first surface is a front surface of the base element and is a mold-replicated aspherical correcting surface.

5. An optical sighting device according to claim 1 or claim 2, wherein the sighting image is focused at or near infinity and the optical axis of both aspherical surfaces is parallel with the intended line of sight.

6. An optical sighting device according to claim 1 or claim 2, wherein the optical axis of both aspherical surfaces extends below or intersects the bottom edge of the optical element.

7. An optical sighting device according to claim 1 or claim 2, wherein the optical element is one of a pair of optical elements formed from one originating element of transparent material by a method including the step of dividing the originating element in two parts to leave each of said parts with a "dividing" edge created by the dividing method step, the said dividing edge of each part being utilized as a lowermost base edge of that optical element.

8. An optical sighting device according to claim 7, wherein the originating element is shaped to provide at least one substantially straight edge that is not said base edge.

9. An optical sighting device according to claim 7, wherein, after said dividing method step, at least one of the two optical elements derived from the originating element is shaped to provide at least one substantially straight edge that is not said base edge.

10. An optical sighting device according to claim 7, wherein the said optical element is shaped to form a substantially D-shaped optical element, said base edge defining the linear portion of the 'D'.

11. An optical sighting device according to claim 1 or claim 2, wherein the optical element is formed of transparent plastics material.

12. An optical sighting device according to claim 1 or claim 2, wherein the light source is an LED aligned with the optical axis of the optical element and has an emitting area shaped to provide an emitted beam of predetermined recognizable form.

13. An optical sighting device according to claim 1 or claim 2, wherein the light source is an LED aligned with the optical axis of the optical element and has an emitting area shaped to provide an emitted beam having a cross-sectional appearance of a spot or a cross of small area.

14. An optical sighting device according to claim 1 or claim 2, wherein the light source is a quaternary LED.

15. An optical sighting device according to claim 1 or claim 2, wherein the light source is a quaternary fine geometry LED of indium, gallium, aluminum and phosphorous.

16. An optical sighting device according to claim 1 or claim 2, wherein the device includes a cover movable from a covering condition—in which it reduces the power consumption of the light source towards zero and thus acts as though effectively switching off illumination from the light source—and an uncovering condition in which it permits the sighting device to be used.

17. An optical sighting device according to claim 16, and intended for use on a hand gun to be retained in a holster when not being used, wherein the said cover is associated with means for attachment to the holster whereby removal of the gun from its holster by the user removes the cover from the sighting device.

18. An optical sighting device according to claim 16, and intended for use on a hand gun to be retained in a holster when not being used, wherein the said cover is attached to the holster by a lanyard whereby removal of the gun from its holster by the user removes the cover from the sighting device.

19. An optical device for sighting a target to be aimed at in the line of sight of a user, comprising:
    an optical element in which the user views an image of the target, and a source of light directed at and reflected back from the optical element to create a sighting image for the user to align with the image of the target as viewed in the optical element,
    wherein the device includes a cover movable from a covering condition—in which it reduces the power consumption of the light source towards zero and thus acts as though effectively switching off illumination from the light source—and an uncovering condition in which it permits the sighting device to be used.

20. A hand gun or other small arm having mounted thereon a sighting device according to claim 19.

21. An optical sighting device according to claim 19, and intended for use on a hand gun to be retained in a holster when not being used, wherein the said cover is associated with means for attachment to the holster whereby removal of the gun from its holster by the user removes the cover from the sighting device.

22. An optical sighting device according to claim 19, and intended for use on a hand gun to be retained in a holster when not being used, wherein the said cover is attached to the holster by a lanyard whereby removal of the gun from its holster by the user removes the cover from the sighting device.

23. An optical device for sighting a target to be aimed at in the line of sight of a user, comprising:

an optical element in which the user views an image of the target, and a source of light directed at and reflected back from the optical element to create a sighting image for the user to align with the image of the target as viewed in the optical element, wherein the optical element is one of a pair of optical elements formed from one originating element of transparent material by a method including the step of dividing the originating element in two parts to leave each of said parts with a "dividing" edge created by the dividing method step, the said dividing edge of each part being utilized as a lowermost base edge of that optical element.

24. A hand gun or other small arm having mounted thereon a sighting device according to claim 23.

25. An optical device for sighting a target to be aimed at in the line of sight of a user, comprising:

an optical element of transparent material having a first surface to be in use directed towards the target and a second surface in which the the user views an image of the target, and a source of light directed at and reflected back from the second surface to create a sighting image for the user to align with the image of the target as viewed in the optical element, wherein the optical element is a "thick" meniscus optical element—which is to say that it has a thickness at least approximately 25% of the effective diameter of the optical element—and is composed of a base element which
  (a) provides said second surface as a parabolic aspherical surface and defines it as one of short focal length of the order of 2.5 cm (1 inch), and which
  (b) has an aspherical correcting surface that constitutes said first surface and is to minimize aberrations in the image of the target as viewed by the user.

26. An optical device for sighting a target to be aimed at in the line of sight of a user, comprising:

an optical element of transparent material having a first surface to be in use directed towards the target and a second surface in which the the user views an image of the target, and a source of light directed at and reflected back from the second surface to create a sighting image for the user to align with the image of the target as viewed in the optical element, wherein the optical element is a "thick" meniscus optical element—which is to say that it has a thickness at least approximately 25% of the effective diameter of the optical element—and is composed of a base element which provides said second surface as a parabolic aspherical surface and defines it as one of short focal length, namely less than 5 cm, and which
  (b) has an aspherical correcting surface that constitutes said first surface and is to minimize aberrations in the image of the target as viewed by the user, and wherein the second, reflecting, surface of the optical element has a Dichroic coating whereby it reflects selectively a narrow band width of light from the light source eliminates all of these.

27. An optical sighting device according to claim 26, wherein the coating is omitted or coated to a lesser extent on at least a medial part of the optical element bordering a lowermost edge of the optical element.

28. An optical device for sighting a target to be aimed at in the line of sight of a user, comprising:

an optical element of transparent material having a first surface to be in use directed towards the target and a second surface in which the the user views an image of the target, and a source of light directed at and reflected back from the second surface to create a sighting image for the user to align with the image of the target as viewed in the optical element, wherein the optical element is a "thick" meniscus optical element—which is to say that it has a thickness at least approximately 25% of the effective diameter of the optical element—and is composed of a base element which
  (a) provides said second surface as a parabolic aspherical surface and defines it as one of short focal length, namely less than 5 cm, and which
  (b) has an aspherical correcting surface that constitutes said first surface and is to minimize aberrations in the image of the target as viewed by the user;

and further comprising means to mount the sighting device in place of the rear sight of a hand gun and in registry with an existing feature on the gun whereby original alignment can be maintained if the device is removed and replaced.

29. An optical sighting device according to claim 28, wherein the mounting means comprises an adaptor, and wherein locating means are provided for registering the alignment of the device relative to the adaptor.

30. An optical sighting device according to claim 28, wherein the mounting means provides for the sighting device to be mounted on the slide of a hand gun having a rear sight dovetail feature on its upper side, the sighting device being fittingly secured to the existing dovetail feature or a replacement dovetail feature.

31. An optical sighting device according to claim 30 wherein the sighting device is adapted to be secured by screws or studs.

32. An optical sighting device according to claim 30, wherein the device is mounted to fit flush with the slide to achieve optimum compactness and low profile.

33. An optical device for sighting a target to be aimed at in the line of sight of a user, comprising:

an optical element of transparent material having a first surface to be in use directed towards the target and a second surface in which the the user views an image of the target, and a source of light directed at and reflected back from the second surface to create a sighting image for the user to align with the image of the target as viewed in the optical element, wherein the optical element is a thick meniscus optical element—namely one having a thickness at least approximately 25% of the effective diameter of the optical element—and is composed of a base element which
- (a) provides said second surface as a parabolic aspherical surface and defines it as one of short focal length, namely less than 5 cm, and which
- (b) has an aspherical correcting surface that constitutes said first surface and is to minimize aberrations in the image of the target as viewed by the user, wherein the light source is an LED aligned with the optical axis of the optical element and has an emitting area shaped to provide an emitted beam of predetermined recognizable form, and wherein the LED and electronic components associated therewith are encapsulated and, together with battery contacts, provide a single unit.

34. An optical sighting device according to claim 33, wherein the encapsulated electronic unit is isolated from the remainder of the device by a resilient layer.

35. An optical sighting device according to claim 33, wherein the encapsulated electronic unit is isolated from the remainder of the device by a resilient elastomeric layer.

36. An optical device for sighting a target to be aimed at in the line of sight of a user, comprising an optical element of transparent material, and a source of light;

wherein the optical element
- (A) is a thick meniscus optical element, namely one having a thickness at least approximately 25% of the effective diameter of the optical element,
- (B) is selected from a pair of optical elements formed from one originating element of transparent material by a method including the step of dividing the originating element in two parts to leave each of said parts with a dividing edge created by the dividing method step, the said dividing edge of each part being utilized as a lowermost base edge of that optical element,
- (C) has a first surface for facing the target and a second surface in which the user views an image of the target, and
- (D) has its said second surface of short focal length, namely less than 5 cm;

and wherein the said source of light is directed at and reflected back from the second surface to create a sighting image for the user to align with the image of the target as viewed in the optical element.

* * * * *